United States Patent [19]

Duggan

[11] 4,236,192
[45] Nov. 25, 1980

[54] CABINET FOR EXAMINING AND IDENTIFYING SPECIMENS

[75] Inventor: Charles F. Duggan, Jacksonville, Fla.

[73] Assignee: Brandons, Inc., Jacksonville, Fla.

[21] Appl. No.: 3,346

[22] Filed: Jan. 15, 1979

[51] Int. Cl.³ ..................... A47B 97/00; A47F 11/10
[52] U.S. Cl. .................................... 362/133; 362/8;
362/11; 362/16; 362/125
[58] Field of Search ................. 362/1, 2, 8, 11, 33,
362/16, 84, 97, 125, 133, 154, 230, 231, 362,
367, 375, 805; 355/70, 71

[56] References Cited

U.S. PATENT DOCUMENTS

| 846,191 | 3/1907 | Egly | 362/125 |
|---|---|---|---|
| 1,251,031 | 12/1917 | Hoffmann | 312/125 |
| 3,355,982 | 12/1967 | Rendina | 362/2 |
| 3,870,873 | 3/1975 | Mallory | 362/2 |

Primary Examiner—Donald P. Walsh
Attorney, Agent, or Firm—Birch, Stewart, Kolasch & Birch

[57] ABSTRACT

A cabinet structure for identifying and examining objects by illuminating said objects with radiation of selected wavelengths, such as short wave ultraviolet radiation, long wave ultraviolet radiation, visible radiation, and infrared radiation is described. The cabinet structure includes a truncated pyramidal hood wherein light sources for emitting selected wavelengths of radiation are mounted on the respective sloped pyramidal sidewalls of the cabinet for illuminating a specimen mounted beneath the hood. A top surface defining the top of the truncated pyramidal hood has means thereon for mounting a camera such as a photographic camera, TV camera or the like. When it is desired to examine or photograph large documents such as oil paintings the truncated pyramidal hood is placed over the document. For smaller specimens to be examined, the hood is provided with an entrance door in one sidewall thereof through which specimens may be inserted. A back light source module may be provided which is removeably attached to the bottom of the cabinet for transmitting light through the specimen toward the camera at the top of the cabinet. The light assemblies on at least one of the sloped sidewalls of the truncated pyramid hood are mounted in cabinets, which are hinged at the bottom ends so that they may be pivoted back away from the sidewalls on which they are mounted. These sidewalls have filter windows therein with changeable radiation filters, and when the light assembly housings are pivoted back at the hinges these filters may be readily changed to achieve different selected illumination effects.

3 Claims, 2 Drawing Figures

CABINET FOR EXAMINING AND IDENTIFYING SPECIMENS

BACKGROUND OF THE INVENTION

1. Field of the Invention

The present invention relates to an identification and examination unit for illuminating a specimen with a complete spectrum of light including ultraviolet, visible, amd infrared radiation. More specifically, the present invention relates to a cabinet structure including light sources which emit light in the aforementioned wavelengths for identification and examination of specimens by a camera mounted on the top surface of the cabinet structure.

2. Description of the Prior Art

Heretofore, cabinet structures have been designed for inspecting and photographing specimens for only special and limited purposes. For example, illumination cabinets are known which include light sources for illuminating an object to be photographed with visible light and other cabinet structures have been designed for illuminating objects with radiation of different wavelengths in order to simulate natural daylight. However, none of the prior art cabinet designs provide illumination means for inspecting, examining, photographing, or viewing specimens under a variety of combinations of lighting conditions throughout the complete spectrum of light. In addition, prior art structures have not had the capability of examining both large and small specimens with the same structure without making extensive modifications to that structure.

The following patents are illustrative of prior art photographic apparatus combined with illuminating cabinets or light supporting structures:

U.S. Pat. No. 2,290,793, Alderman, 7/21/42
U.S. Pat. No. 2,433,133, Lindsey, 12/23/47
U.S. Pat. No. 3,085,154, Kelsh, 4/9/63
U.S. Pat. No. 3,119,301, Beattie et al, 1/28/64
U.S. Pat. No. 3,710,696, Tucker et at, 1/16/73

The Alderman patent discloses a hood structure containing means for illuminating an object to be photographed in a camera mounted on top of the hood structure.

Lindsey discloses a portable and collapsable stand for cameras including illumination means disposed on sloped side supports on opposite sides of the optical path of the camera mounted on the top of the support.

Kelsh discloses a cabinet for making photographic prints from a roll of film including infrared light sources, and ultraviolet light sources both above and below the film to be reproduced.

Beattie et al discloses a lighting system for a photographic camera including a plurality of light sources on opposite sides of the optical axis of the camera for illuminating an object from the top, and a subassembly disposed behind the object to be photographed for back-lighting the same.

Tucker discloses a photographic apparatus in combination with a camera including a plurality of light sources for top lighting the specimen to be photographed and a plurality of light sources for back lighting the specimen.

Other similar prior art devices of a similar nature to those discussed above are illustrated in the following U.S. Patents:

U.S. Pat. No. 2,403,892, McFarlane er al, 7/9/46
U.S. Pat. No. 2,771,002, Mayo et al, 11/20/56
U.S. Pat. No. 2,933,012, Church, 4/19/60
U.S. Pat. No. 3,263,582, Gatley et al, 8/2/66
U.S. Pat. No. 3,611,897, Owens, 10/12/71
U.S. Pat. No. 3,791,734, Mey, 2/12/74

The following U.S. Patents disclose cabinet structures including illumination means for simulating natural daylight in order to detect the true color of objects being examined:

U.S. Pat. No. 1,249,443, Macbeth, 12/11/17
U.S. Pat. No. 1,423,882, Radford, 7/25/22
U.S. Pat. No. 3,093,319, Gamain, 6/11/63
U.S. Pat. No. 3,355,982, Rendina, 12/5/67

The following U.S. Patents disclose state of the art of daylight sources per se designed for various uses:

U.S. Pat. No. 2,725,461, Amour, 11/29/55
U.S. Pat. No. 2,836,707, Stitt, 5/27/58
U.S. Pat. No. 3,746,080, Mallory, 7/17/73
U.S. Pat. No. 3,870,873, Mallory, 3/11/75
U.S. Pat. No. 4,091,441, Ott, 5/23/78

All of the above prior art references merely point out a long felt need in the art for a cabinet structure having the capabilities of substantially all of the prior art devices in a single unit to provide for complete flexibility and versatility in the identification, examination, inspection, or photography of specimens of many different forms.

SUMMARY OF THE PRESENT INVENTION

Accordingly, it is a primary object of the present invention to provide within a single cabinet structure illumination means for irradiating a specimen with a full spectrum of radiation in combination with a camera or other suitable viewing device.

It is another object of the present invention to provide a cabinet structure for examining and identifying objects of many different sizes without modifying the structure of the cabinet.

It is still another object of the present invention to provide an illuminating cabinet structure which is well suited for criminology and forensic medicine application.

It is a further object of the present invention to provide an illuminating cabinet structure which is useful in inspecting and repairing large paintings such as those found in the art galleries and museums.

It is still a further object of the present invention to provide an illuminating cabinet structure which is useful in the field of archaeology for examining fossels and sediments.

It is yet another object of the present invention to provide an illuminating cabinet structure which is useful for checking documents for alteration, forgeries or erasures, such as would be needed in banks and Government clearing houses.

It is still another object of the present invention to provide an illuminating cabinet structure which is useful in all fields of medicine.

It is still another object of the present invention to provide an illuminating cabinet structure and inspection device which is useful in botony and biology research.

It is a further object of the present invention to provide an illuminating cabinet structure which may be used in industry for the nondestructive testing of manufacture articles.

These and other objects of the present invention are fulfilled by providing a cabinet unit including illumination means for emitting short wave ultraviolet, long wave ultraviolet, visible, and infrared radiation onto a specimen to be examined. The cabinet may be used in conjunction with light intensifiers and/or closed circuit television for visual examination and/or recording of the specimen contained within the cabinet. Any type of camera may be provided for recording an image of the specimen under test. The photography performed may be still or movie photography with color, infrared, black and white or poloroid emulsions, as desired. The cabinet structure includes a metal light-tight module in the shape of a truncated pyramidal hood with a detachable bottom for placement on large documents, such as murals or paintings. For smaller specimens an access door is provided in one wall of the cabinet for the insertion of specimens.

The sloped sidewalls of the truncated pyramidal portion of the cabinet are each provided with light sources which emit radiation in different selected regions of the spectrum, for example, ultraviolet, infrared, or visible. At least some of the light sources include removeable filter means mounted in the sloped walls of the cabinet which may be interchanged as desired to permit complete barrier, transmission, and separation latitude. The light sources mounted adjacent these filters are mounted in housings which pivot back away from the filters to facilitate the changing of the filters or the light sources when needed.

The access door for the specimen may be provided with a safety switch for protection against short wave ultraviolet radiation. All other light sources are controlled by manual switches and the entire unit is ground wired and fused for safety purposes.

A separate attachable back lighting module is provided which can be latched to the base of the camera hood, when it is desired to back light an object to be photographed or when a transmission test of the specimen is desired.

The cabinet structure of the present invention is particularly useful for law enforcement purposes for inspecting documents such as checks, clothing for laundry marks, semen, powder burns; finger prints with UV powders to render visible the finger prints; for viewing theft detection powders or base.

The apparatus of the present invention may also be utilized for inspecting paintings, to assist in the repair thereof, or for the examination of articles to determine the presence of dyes, fats, minerals, oils, papers, resins, wax, foods, drugs, body fluids, and living organs and tissue.

BRIEF DESCRIPTION OF THE DRAWINGS

The objects of the present invention and the intended advantages thereof will become more readily apparent with reference to the drawings wherein like numerals refer to like parts and wherein.

DETAILED DESCRIPTION OF THE PREFERRED EMBODIMENT

Figure 1:
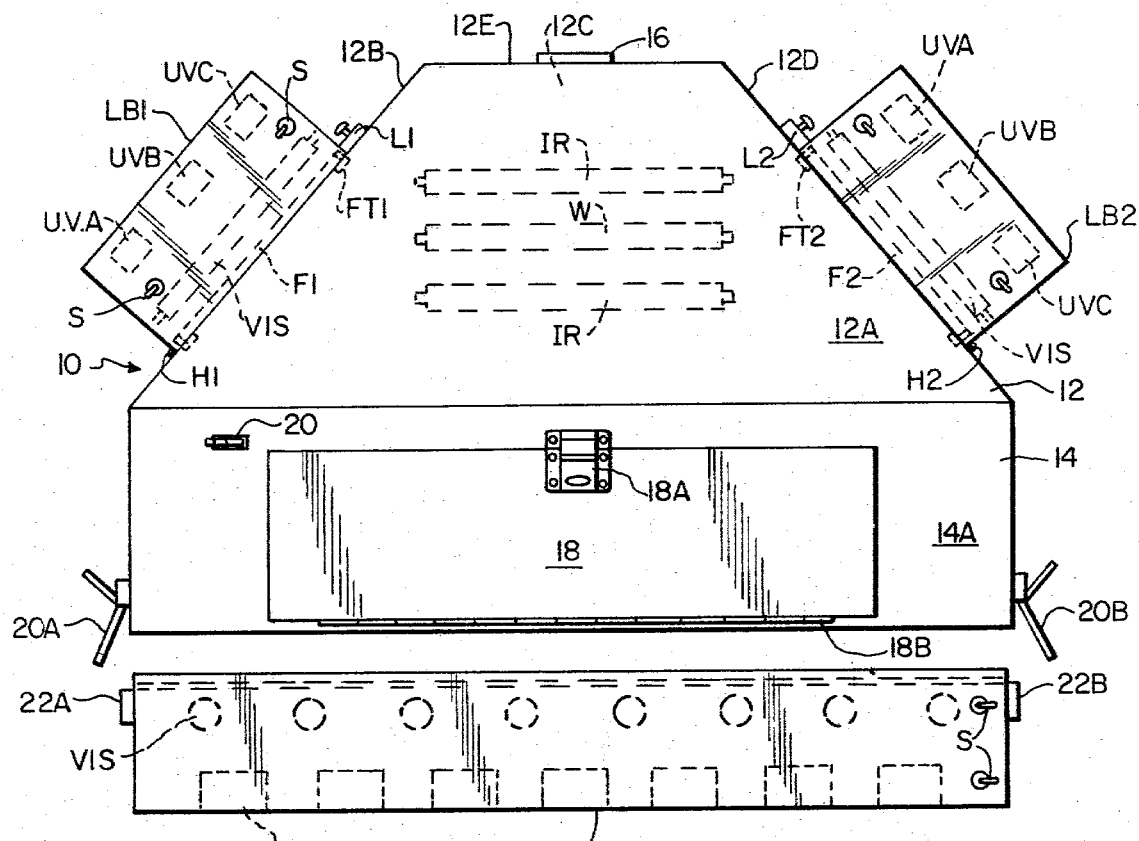
FIG. 1 is a front elevational view of the cabinet structure in accordance with the present invention.
Figure 2:
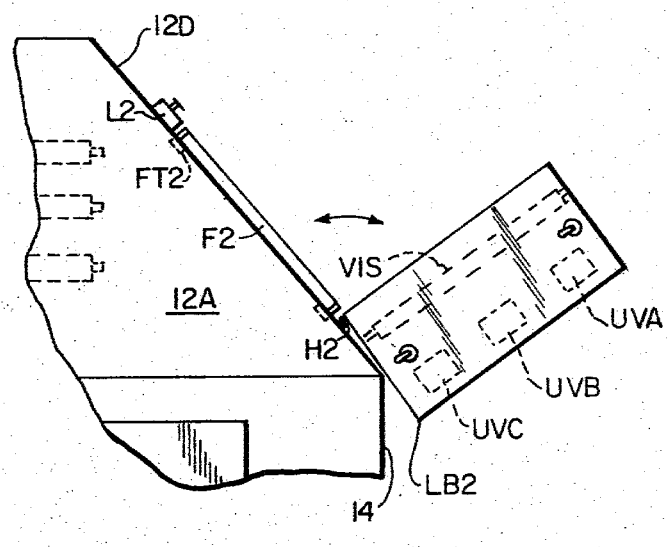
FIG. 2 is a front elevational view of the cabinet structure in accordance with the present invention demonstrating the manner in which the filters and light bulbs of a light assembly of the present invention may be interchanged.

Referring in detail to the drawings there is illustrated a cabinet 10 including a top hood portion 12, 14, and a removeable bottom 22. The hood portion includes a truncated pyramid section 12 having sloped sidewalls 12A, 12B, 12C, and 12D and a top planar surface 12E. Extending downwardly from the bottom of the sloped sidewalls 12A, 12B, 12C, 12D is an open bottom rectangular skirt portion 14 having a specimen access door 18 formed in wall 14A thereof. Door 18 is hinged at the bottom at 18B and has a latch and handle 18A at the top thereof. Top surface 12E is provided with a camera mounting means 16 on which a photographic camera of the still or movie type, or any suitable form of electronic viewing device including a television monitor or image intensifier may be mounted.

The hood structure including sections 12 and 14 is open at the bottom so that, if desired, the hood structure may be placed over a document or object to be examined, identified, or photographed. In order to provide a clear optical path for the camera mounted at 16, the light sources of the present invention are either mounted on the four sloped sidewalls 12A, 12B, 12C, 12D, or in a optional back light source module 22 which may be removeably secured to the bottom of the hood structure by latches 20A, 20B which hook onto members 22A, 22B on modular unit 22.

The lighting system of the present invention includes almost every conceivable type of light source which might be needed in order to identify or examine an object or specimen disposed beneath the hood. For example, the light sources include ultraviolet radiation sources of all different wavelength ranges, infrared radiation light sources, and white light sources. These light sources may be energized in selected combinations or individually to produce any selected type of illumination needed for the specific specimen being examined or photographed.

A main power switch 20 is provided on face 14A of the hood structure to provide power to the cabinet and suitable manual switches S are provided at the locations of the different respective light sources so they may be individually illuminated, as desired. In addition, door 18 may be provided with a safety switch in circuit with the short wave UV lamps to preclude injury therefrom.

In a preferred embodiment the front and rear sloped sidewalls 12A, 12C of the truncated pyramid portion 12 of the hood have infrared and white light sources IR and W mounted on the inside surfaces of the hood, and sloped sidewalls 12B and 12D have light assemblies LB1 and LB2 mounted on the external surfaces in registry with filter windows F1 and F2, respectively. Light assemblies LB1 and LB2 consist of rectangular light boxes which are hinged at the bottom by hinges H1 and H2 and are normally latched against the sloped pyramidal walls by latch means L1, L2. However, when it is desired to, either change one of the light sources within light assemblies LB1 or LB2, or to change one of the filters F1, F2, the light boxes may be pivoted back around hinges H1, H2 and the light bulbs and/or filters changed as desired. Filters F1, F2 are slidably mounted on tracks T1, T2, respectively.

In a preferred embodiment each of the light assemblies LB1, LB2 has included therein three ultraviolet light sources for radiating light in three separate regions of the ultraviolet spectrum. For example, ultraviolet light sources UVA and UVC generate ultraviolet radiation in the low and high UV regions, respectively, and ultraviolet source UVB emits radiation in the intermediate region of the ultraviolet spectrum. Each of the light assemblies LB1, LB2 also includes a plurality of visible light sources VIS which may emit white light or any other wavelength of radiation desired.

A separate attachable module 22, as described hereinbefore is removeably attached to the bottom of the cabinet hood section by latches 20A, 20B. This module 22 is used for back lighting for transmission type of examinations or for use in combination with the top lighting from the sloped walls of the hood.

The structure of the present invention being thus described it should be understood that the disclosed structure may be modified as would occur to one of ordinary skill in the art without departing from the spirit and scope of the present invention.

It is claimed:

1. A cabinet structure for illuminating a specimen to be examined with selected wavelengths of radiation comprising:

a hood having a top section with sidewalls sloping outwardly and downwardly to define a truncated pyramid and having an open bottom section defined by a rectangularly shaped skirt portion extending downwardly from the bottom of said top section;

an access door provided in said skirt for the insertion and removal of specimens beneath said hood;

illumination means disposed on the sidewalls of said hood, at least one of said illumination means including removable radiation filter means disposed across an opening in one of said sidewalls, and a light box normally in registry with said filter means, said light box including a plurality of removable light sources;

mounting means for said light box to permit pivoting of said light box out of registry with said filter means to facilitate the changing of said filter means or said light sources;

specimen viewing means on the top of said hood; and a bottom means including back lighting means removably attachable to the bottom of said skirt, whereby said cabinet structure may be selectively used with an open bottom when said removable bottom means is removed from said skirt or may be provided with specimen back lighting when said bottom means is attached to said skirt.

2. The cabinet of claim 1, wherein said viewing means includes a support for a photographic camera.

3. The cabinet of claim 1, wherein said viewing means includes a support for a TV camera.

* * * * *